(12) United States Patent
Bourzier (10) Patent No.: US 9,404,768 B2
(45) Date of Patent: Aug. 2, 2016

(54) METHOD AND A SYSTEM FOR HARMONIZING A FRAME OF REFERENCE OF AN ANGULAR POSITIONER RELATIVE TO A TERRESTRIAL FRAME OF REFERENCE

(75) Inventor: Laurent Bourzier, Bourges (FR)

(73) Assignee: MBDA FRANCE, Paris (FR)

( * ) Notice: Subject to any disclaimer, the term of this patent is extended or adjusted under 35 U.S.C. 154(b) by 653 days.

(21) Appl. No.: 13/811,464

(22) PCT Filed: Jul. 21, 2011

(86) PCT No.: PCT/FR2011/051770
§ 371 (c)(1),
(2), (4) Date: May 2, 2013

(87) PCT Pub. No.: WO2012/010809
PCT Pub. Date: Jan. 26, 2012

(65) Prior Publication Data
US 2013/0213111 A1     Aug. 22, 2013

(30) Foreign Application Priority Data
Jul. 23, 2010  (FR) ..................................... 10 56063

(51) Int. Cl.
*G01C 17/38* (2006.01)
*G01C 25/00* (2006.01)
*G01C 21/16* (2006.01)

(52) U.S. Cl.
CPC ............... *G01C 25/00* (2013.01); *G01C 21/16* (2013.01); *G01C 25/005* (2013.01)

(58) Field of Classification Search
CPC ....... G01C 25/00; G01C 21/16; G01C 25/005

USPC .......................................................... 73/1.78
See application file for complete search history.

(56) References Cited

U.S. PATENT DOCUMENTS

| 3,597,598 A | 8/1971 | McAllister et al. |
| 2002/0178815 A1 | 12/2002 | Challoner |
| 2008/0202199 A1 | 8/2008 | Finley et al. |

FOREIGN PATENT DOCUMENTS

FR          2 927 418          8/2009

OTHER PUBLICATIONS

International Search Report as issued for PCT/FR2011/051770.

*Primary Examiner* — Hezron E Williams
*Assistant Examiner* — Rodney T Frank
(74) *Attorney, Agent, or Firm* — Pillsbury Winthrop Shaw Pittman LLP (57) ABSTRACT

A method for harmonizing a frame of reference of an angular positioner to receive a moving body relative to the terrestrial frame of reference, the angular positioner carrying a measurement device for taking inertial measurements of the moving body, the method includes obtaining, using inertial measurements taken by a measurement device on-board the angular positioner during at least one predetermined operating period, values representative of a local magnitude of gravity as perceived by the measurement device and/or of a speed of rotation of the earth, the angular positioner being held stationary during the at least one operating period; evaluating, using the obtained values, at least one angular bias affecting the frame of reference of the positioner; and harmonizing the frame of reference of the positioner relative to the terrestrial frame of reference by compensating for the at least one angular bias as evaluated in this way.

13 Claims, 6 Drawing Sheets

METHOD AND A SYSTEM FOR HARMONIZING A FRAME OF REFERENCE OF AN ANGULAR POSITIONER RELATIVE TO A TERRESTRIAL FRAME OF REFERENCE

CROSS REFERENCE TO RELATED APPLICATIONS

This application is the LS. National Stage of PCT/FR2011/051770, filed Jul. 21, 2011, which in turn claims priority to French Patent Application No, 1056063; filed Jul. 23, 2010, the entire contents of all applications are incorporated herein by reference in their entireties.

BACKGROUND OF THE INVENTION

The invention relates to harmonizing, relative to the terrestrial frame of reference, a frame of reference of an angular positioner that is adapted to receive a moving body or a flying vehicle for which it is desired, for example, to test its performance (e.g. a missile, an airplane, a rocket, etc.).

Harmonizing the frame of reference of the angular positioner relative to the terrestrial frame of reference is used herein to mean orienting axes of the angular positioner relative to the axes of the terrestrial frame of reference, i.e. orienting an axis of the frame of reference of the angular positioner in the geographical north position and positioning the other two axes of the frame of reference of the angular positioner relative to the vertical at the location of the positioner (i.e. one of them oriented along the local vertical and the other one perpendicular to the vertical).

By way of example, the angular positioner may be an angular movement simulator, a test bench, or a micrometric table. It may be used in particular in the context of hybrid simulation, as described in document FR 2 927 418.

The invention thus applies in preferred but non-limiting manner to the field of aviation.

In known manner, a moving body suitable for mounting on such an angular positioner is conventionally provided with an inertial measurement device having gyros (rate gyros and/or free gyros) and/or accelerometers, such as an inertial unit. The inertial measurements delivered by the measurement device relate in particular to the angular speed and/or the acceleration of the moving body to which it is fitted.

Harmonizing the frame of reference of the angular positioner relative to a given frame of reference, typically relative to the terrestrial frame of reference, makes it easier to make use of the inertial measurements delivered by the measurement device during hybrid simulation.

Harmonization also makes it possible to avoid falsifying navigation of the moving body that is being carried by the angular positioner for the purpose of testing the performance of that moving body.

In addition, harmonizing the frames of reference with each other ensures that the test carried out on the moving body (or on its equipment, e.g. the inertial unit of the moving body) are repeatable and accurate, thereby guaranteeing that the results of the hybrid simulation are reliable.

In order to perform such harmonization, it is known to have recourse to expensive pieces of equipment that are not readily available, such as a north seeker, a theodolite, and/or high precision electronic level-measuring instruments, as described in particular in document FR 2 927 418. Nevertheless, using such equipment makes it necessary to rely on qualified personnel.

When a repair is carried out on the angular positioner as a result of a breakdown, it often happens that the angular positioner is no longer properly referenced relative to the terrestrial frame of reference, i.e. the frame of reference of the angular positioner is no longer harmonized relative to the terrestrial frame of reference. It is then difficult to make available quickly the equipment and the personnel needed for harmonizing the frames of reference relative to each other once more, and that can be harmful to progress in the tests being carried out on the moving body.

There therefore exists a need to have a method of harmonizing the frame of reference of the angular positioner relative to the terrestrial frame of reference that does not suffer from such drawbacks, and in particular that enables the frames of reference to be harmonized relative to each other in a manner that is simple and reliable and in a length of time that is relatively short.

OBJECT AND SUMMARY OF THE INVENTION

The present invention satisfies this need by proposing a method of harmonizing a frame of reference of an angular positioner carrying an inertial measurement device relative to a terrestrial frame of reference, the method comprising:
 an obtaining step of using inertial measurements taken by the measurement device during at least one predetermined operating period to obtain values representative of a local magnitude of gravity as perceived by the measurement device and/or of a speed of rotation of the earth, the angular positioner being held stationary during said at least one operating period;
 an evaluation step of using the values obtained to evaluate at least one angular bias affecting the frame of reference of the positioner; and
 a harmonization step of harmonizing the frame of reference of the positioner relative to the terrestrial frame of reference by compensating for said at least one angular bias as evaluated in this way.

Correspondingly, the invention also provides a system for harmonizing a frame of reference of an angular positioner carrying an inertial measurement device relative to a terrestrial frame of reference, the system comprising:
 obtaining means for using the inertial measurements taken by the measurement device during at least one predetermined operating period to obtain values representative of a local magnitude of gravity as perceived by the measurement device and/or of a speed of rotation of the earth, the angular positioner being held stationary during said at least one operating period;
 evaluation means for evaluating at least one angular bias affecting the frame of reference of the positioner on the basis of the values obtained; and
 harmonization means for harmonizing the frame of reference of the positioner relative to the terrestrial frame of reference and including means for compensating said at least one angular bias as evaluated in this way.

The invention thus proposes a technique for harmonizing the frame of reference of the angular positioner with the terrestrial frame of reference that is simple, fast and reliable. For this purpose, it advantageously makes use of the inertial measurements delivered by a measurement device such as an inertial unit as is conventionally present on the moving bodies that are likely to be carried by the angular positioner.

Thus, the inertial measurements are, for example, taken with the help of at least one accelerometer and/or of at least one gyro fitted to the measurement device. The accuracy of the measurement device used needs to match the accuracy that is looked for in the harmonization.

The invention thus does not need to have recourse to equipment that is expensive and difficult to operate such as a north seeker coupled with a theodolite and/or precision level-measuring equipment.

During the obtaining step, it is possible in particular to obtain values representative of a local magnitude of gravity as perceived by the measurement device; it is then possible during the evaluation step and from these values to evaluate an angular bias in elevation (i.e. between the longitudinal axis of the angular positioner and the horizontal plane) and/or in cant (i.e. between the transverse axis, perpendicular to the longitudinal axis, and the horizontal plane).

Correspondingly, the obtaining means may be suitable for obtaining values representative of a local magnitude of gravity as perceived by the measurement device, and the evaluation means may be suitable for evaluating an angular bias in elevation and/or in cant from these values.

In a variant, it is also possible during the obtaining step to obtain values representative of a speed of rotation of the earth; it is then possible during the evaluation step and from these values to evaluate an angular bias in heading (i.e. between the longitudinal axis of the angular positioner and geographical north).

Correspondingly, the obtaining means may be suitable for obtaining values representative of a speed of rotation of the earth, and the evaluation means may be suitable for evaluating an angular bias in heading from these values.

The invention thus makes it possible to compensate any bias in evaluation and/or in cant and/or in heading that may exist between the frame of reference of the angular positioner and the terrestrial frame of reference.

It should be observed that although the frame of reference of the angular positioner is not necessarily affected by all of these three types of bias, it is preferable to expect that these three types of bias all exist in order to ensure that the frame of reference of the angular positioner is harmonized reliably relative to the terrestrial frame of reference.

In a variant, it is possible to envisage verifying the positioning of the non-corrected axes by having recourse to other precision equipment such as a north seeker coupled to a theodolite and/or precision level-measuring equipment.

In a particular implementation in which at least one angular bias in elevation and/or in cant and at least one angular bias in heading are compensated, the angular bias in elevation and/or in cant is compensated prior to the operating period during which the inertial measurements used for evaluating the bias in heading are taken by the measurement device.

This avoids errors tainting the inertial measurements used for evaluating the bias in heading, since the angular biases in elevation and/or in cant that might affect the angular positioner have already been corrected. This serves to improve the accuracy with which the frames of reference are harmonized.

In a particular implementation, during the obtaining step, the values representative of a local magnitude of gravity as perceived by the measurement device and/or of a speed of rotation of the earth are obtained by summing the inertial measurements taken over said at least one operating period.

This makes it possible in particular to avoid effects tainting the inertial measurements delivered by the measurement device, which measurements may be discrete. By summing the inertial measurements over the operating period, measurement noise is smoothed. In addition, it is also possible in this way to take account of the rounding that results from digitizing the inertial measurements.

In a particular implementation, the various steps of the harmonization method of the invention are determined by computer program instructions.

Consequently, the invention also provides a computer program on a data medium, the program being suitable for being run in a harmonization system or more generally in a computer, the program having instructions adapted to perform steps of a harmonization method as described above.

The program may use any programming language, and may be in the form of source code, object code, or of code intermediate between source code and object code, such as in a partially compiled form, or in any other desirable form.

The invention also provides a computer-readable data medium having instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal that can be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
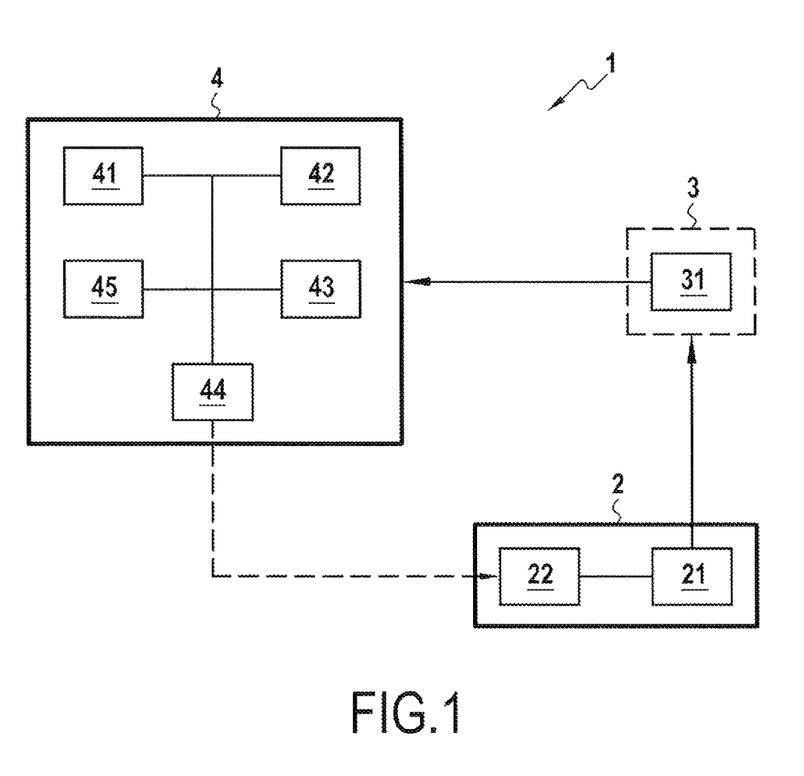
FIG. 1 is a block diagram of a harmonization system in accordance with the invention, in a particular embodiment.

FIG. 1 shows a system 1 for harmonizing a frame of reference of an angular positioner 2 relative to a terrestrial frame of reference in accordance with the invention, in a particular embodiment.

As mentioned above, the concept of harmonizing the frame of reference of the angular positioner 2 relative to the terrestrial frame of reference is used herein to mean orienting the axes of the angular positioner 2 relative to the axes of the terrestrial frame of reference, i.e. relative to geographical north and to the vertical at the location of the angular positioner.

The frame of reference of the angular positioner 2 may be harmonized relative to the terrestrial frame of reference by the system 1, in particular after the angular positioner has been repaired or after a maintenance operation has been performed on the angular positioner having the result of introducing one or more angular biases between the frame of reference of the angular positioner and the terrestrial frame of reference.

In the example described herein, the angular positioner 2 is a simulator of angular movements having a "3-axis" table 21 controlled with the help of a digital control unit 22 and adapted to receive a moving body or a flying vehicle 3.

The moving body 3 may in particular be a missile, a drone, an airplane, a rocket, etc. It is conventionally fitted with an inertial unit 31 having measurement tools such as gyros (rate gyros or free gyros) and accelerometers (not shown in FIG. 1), enabling the inertial unit to deliver inertial measurements from the gyros and the accelerometers when it is in operation.

In the embodiment described herein, only the inertial unit 31 is on board the movement simulator, in order to simplify performing the invention. The inertial unit 31 constitutes a device for taking inertial measurements that is mounted on board the angular positioner 2 in the meaning of the invention.

Nevertheless, in a variant, other physical elements of the moving body 3 could also be mounted on board the movement simulator, e.g. such as the computer or guidance equipment of the moving body.

In addition, the invention also applies to other angular positioners, such as for example an angular movement simulator having a "5-axis" table, a micrometer table, or a test bench, having inertial measurement taking devices mounted thereon.

The angular movement simulator 2 in this example can perform angular movements about a longitudinal axis X (roll), a transverse axis Y (pitching), and a vertical axis Z (yaw), and can thus apply angular movements to the inertial unit 31 about these three axes. These angular movements are applied by the table 21 as a function of digital movement commands received from the unit 22.

The digital movement commands received from the unit 22 comprise in particular an angular position expressed in the form of three components that correspond respectively to the three axes of the movement simulator. They may also include an angular speed and an angular acceleration.

Since the principle on which such a "3-axis" table operates is known to the person skilled in the art, it is not described in greater detail herein.

In the meaning of the invention, it is considered that the movement simulator 2 is held stationary when it is not performing any angular movement, in other words when it is not applying any angular movement to the inertial unit 31 and when it is holding the unit in a fixed position referred to as a reference position.

In general, the inertial measurements taken by the gyros and the accelerometers of the inertial unit 31 are representative firstly of the effects of the movements applied by the movement simulator 2 to the inertial unit, and secondly of terrestrial effects (the local magnitude of gravity and the speed of rotation of the earth) as perceived by the inertial unit. It thus follows that when the movement simulator 2 is held stationary and is applying no movement to the inertial unit 31, these inertial measurements are representative solely of the terrestrial effects as perceived by the inertial unit.

The inertial measurements taken by the inertial unit 31 in this example are delivered to a computer device or system 4 via conventional electronic and mechanical connections.

The computer device 4 comprises in particular a random access memory (RAM) 41, a ROM 42, and a non-volatile memory 43. It also has communications means 44 for communicating with the movement simulator 2 (e.g. a serial or parallel port connected to the unit 22 for controlling the movement simulator), and a processor 45. The communications means 44 of the computer device 4 and the control unit 22 are connected together by conventional mechanical and electronic connections that are not described herein.

The ROM 42 constitutes a recording medium that is readable by the processor 45 and that has recorded thereon a computer program having instructions for executing steps of the harmonization method of the invention as described below with reference to FIG. 2.

In the implementation described herein, the idea is to harmonize the three movable axes X, Y, and Z of the frame of reference of the movement simulator 2 relative to the terrestrial frame of reference. Nevertheless, the invention applies equally to an angular positioner having only one or two movable axes. Under such circumstances, the stationary axes of the angular positioner may be positioned beforehand by precision instruments, e.g. when constructing the installation incorporating the angular positioner.

Furthermore, for simplification purposes, it is assumed herein that the axes of the movement simulator 2 and the axes of the inertial unit 31 are parallel or coincide. The frame of reference of the inertial unit 31 is written (X, Y, Z).

Thus, by evaluating the angular biases that exist between the axes X, Y, and Z of the inertial unit 31 and the terrestrial frame of reference, the angular biases that exist between the frame of reference of the angular movement simulator 2 and the terrestrial frame of reference are evaluated. Naturally, the invention applies equally when there exist one or more known angular differences between the axes of the movement simulator 2 and the axes of the inertial unit 31, providing those differences are taken into account.

In order to harmonize the three axes of the movement simulator 2 relative to the terrestrial frame of reference, two successive stages $\Phi 1$ and $\Phi 2$ are performed in this implementation. More precisely:

during the stage $\phi 1$, the angular biases in elevation and in cant that might affect the positioning of the axes of the movement simulator relative to the vertical at the site are identified and compensated; and during the stage $\Phi 2$, an angular bias in heading that might affect the positioning of the axes of the movement simulator relative to geographical north is identified and compensated.

The stage $\Phi 3$ preferably follows the stage $\Phi 1$ in order to avoid the angular biases in elevation and in cant interfering with the inertial measurements used for compensating the bias in heading. Thus, at the end of stage $\Phi 2$, the frame of reference of the movement simulator is reliably harmonized relative to the terrestrial frame of reference.

In order to identify the biases in elevation, in cant, and in heading that might affect the axes of the movement simulator relative to the terrestrial frame of reference, the invention advantageously proposes using the measurements delivered by the inertial unit 31 while the movement simulator 2 is held stationary. As mentioned above, under such circumstances, the inertial measurements taken by the inertial unit 31 are representative of the terrestrial effects that are applied to the inertial unit. In particular, the inertial measurements taken by the accelerometers of the inertial unit represent the local magnitude of gravity acting on the inertial unit, while the inertial measurements taken by the gyros of the inertial unit represent the speed of rotation of the earth.

There follows a description in greater detail of the steps in the two stages Φ1 and Φ2.

The movement simulator 2 and the inertial unit 31 are put into operation.

For simplification purposes, the movement simulator 2 is adjusted in such a manner that when it holds the inertial unit 31 in its reference position Pref, the measurement delivered by the digital control unit 22 for each axis is equal to zero. In a variant, some other adjustment could be envisaged, providing it is subsequently taken into account in conventional manner while performing harmonization.

In order to ensure the inertial unit 31 is operating, computer simulation implemented by the computer device 4 is performed to run the movable body 3 through a trajectory in application of a principle similar to that described for example in document FR 2 927 418.

In a variant, any other means, e.g. computer means, could be envisaged for keeping the movement simulator 2 and the inertial unit 31 in operation.

The trajectory is run through over a period that is long enough to ensure that the inertial unit 31 operates during at least two operating periods T1 and T2 of predetermined durations, associated respectively with the stages Φ1 and Φ2.

In a variant, two distinct trajectories for the frame of moving body 3 may be run through by the computer device 4 so as to ensure that the inertial unit is operating during each of the operating periods T1 and T2, respectively.

Throughout the duration of the two operating periods T1 and T2 encountered during the trajectory that is run through by the computer device 4, it is ensured that the movement simulator 2 does not receive any digital command from the computer device 4: the movement simulator 2 is thus held stationary and the inertial unit 31 is in its reference position Pref. In other words, while the two operating periods T1 and T2 that are encountered during the trajectory are being run through, the movement simulator 2 does not apply any movement to the inertial unit 31 and it keeps it in its reference position Pref.

Thus, throughout the duration of the two operating periods T1 and T2 encountered during the trajectory, the inertial measurements that are taken and delivered by the inertial unit 31 are associated exclusively with the terrestrial effects exerted on the inertial unit. More precisely, the inertial unit 31 delivers in its own rectangular frame of reference (X, Y, Z):
  inertial measurements taken by its accelerometers relative to the axes (X, Y, Z) of the inertial unit, and written dVX, dVY, and dVZ; and
  inertial measurements taken by its gyros about the axes (X, Y, Z) of the inertial unit, and written dθX, dθY, and dθZ.

Figure 3A:
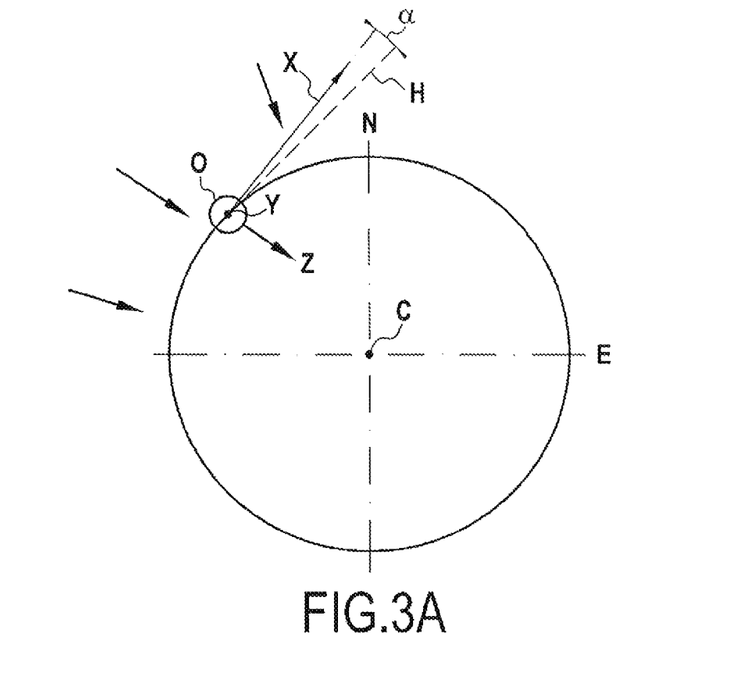
FIGS. 3A and 3B show examples of bias in elevation and in cant that affect the frame of reference of an angular positioner.
Figure 3B:
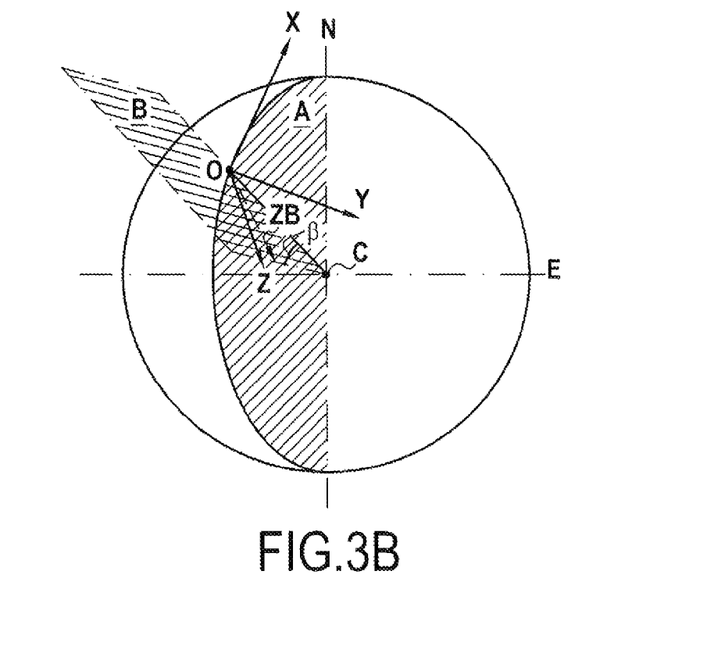

An example of the positioning of the axes (X, Y, Z) of the inertial unit 31 prior to harmonization is shown in FIGS. 3A and 3B, in which:
  the points O and C designate respectively the point of coincidence of the three axes X, Y, and Z, and the center of the earth;
  the axes N and E designate respectively geographical north and the equator; and
  the plane H represents the horizontal plane perpendicular to the vertical at the location of the point O.

It should be observed that the invention is preferably performed using equipment (movement simulator 2, inertial unit 31, etc.) that has previously been operating for a length of time that is sufficient to have reached an internal operating temperature that varies little while taking the measurements for evaluating and compensating the angular biases that affect the frame of reference of the movement simulator.

As mentioned above, during the stage Φ1, the invention proposes identifying and compensating the angular biases in elevation and in cant that might exist between the axes of the inertial unit and the axes of the terrestrial frame of reference.

For this purpose, and with reference to FIGS. 3A and 3B, the invention advantageously makes use of the fact that gravity (represented by bold arrows in FIG. 3A) is a terrestrial effect that acts radially and that is directed towards the center C of the earth, i.e. along the vertical at the location. Since the inertial measurements delivered by the accelerometers of the inertial unit 31 are representative of the magnitude of gravity acting at the point O, the axes of the movement simulator are correctly oriented relative to the vertical at the location, if and only if, only the inertial measurements along the axis Z of the inertial unit are not zero. In other words, if the inertial unit 31 measures non-zero acceleration along more than one of its axes (or at least acceleration that is not close to zero depending on measurement accuracy), then its Z axis is not harmonized with the vertical at the location, and the axes X and Y do not lie in the horizontal plane H that is perpendicular to the vertical at the location.

With reference to FIGS. 3A and 3B, in the description below, the following notation is used:
  α is the angular difference (or bias) that exists between the axis X of the inertial unit 31 and the horizontal plane H. In the meaning of the invention, the angle α represents the elevation bias of the frame of reference of the inertial unit (and thus in this example of the movement simulator 2) relative to the terrestrial frame of reference (cf. FIG. 3A); and
  β is the angular difference that exists between the axis ZB and the straight line OC (cf. FIG. 3B), given that:
    the axis ZB is the projection of the axis Z on the plane B; and
    the plane B is the plane perpendicular to the plane A containing the line OC, the plane A being the meridian plane containing the line OC.

In the meaning of the invention, the angle β represents the bias in cant of the frame of reference of the inertial unit (and thus of the movement simulator 2) relative to the terrestrial frame of reference.

Figure 2:
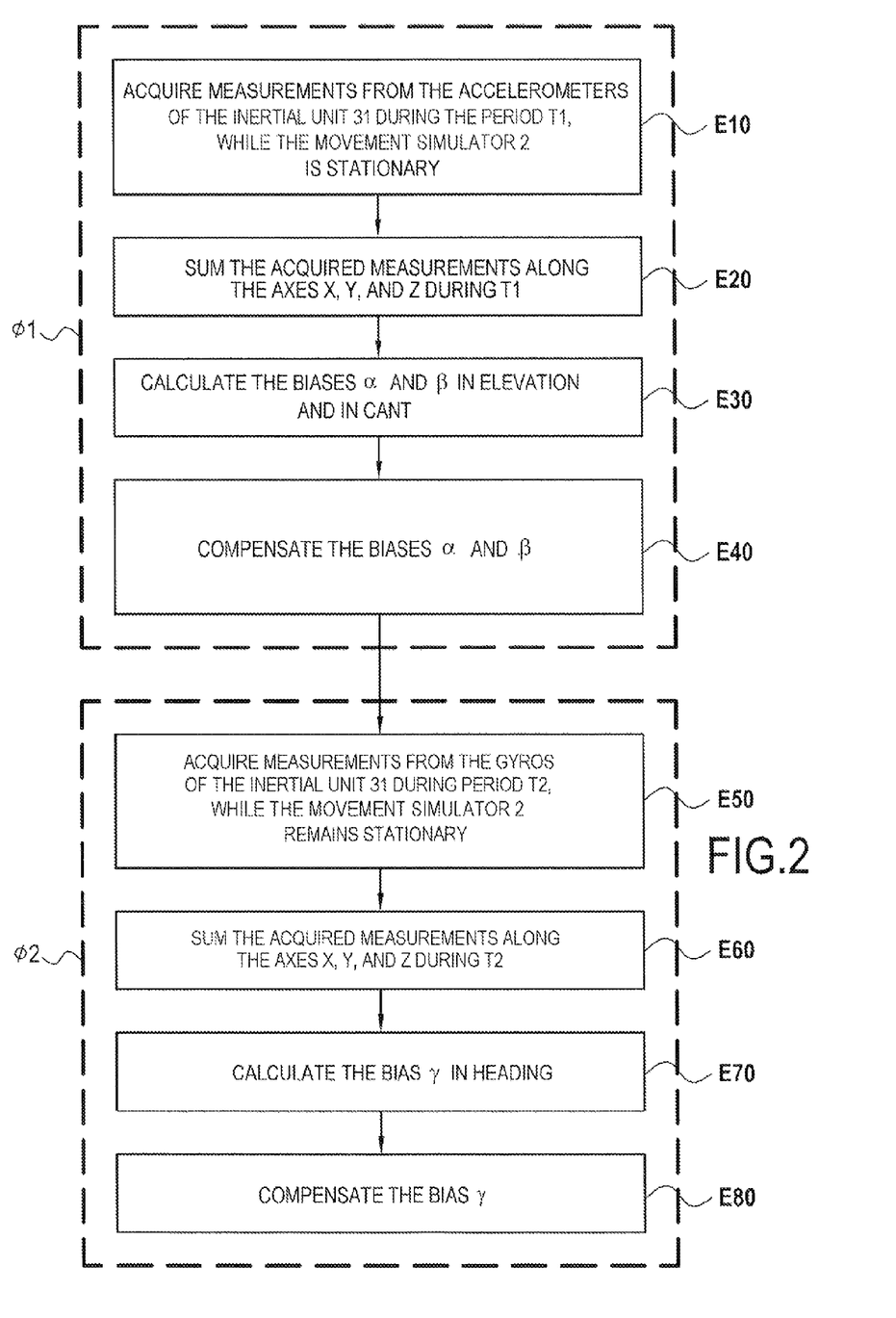
FIG. 2 is a flow chart showing the main steps of a harmonization method in accordance with the invention, in a particular implementation in which the method is performed by the system shown in FIG. 1.

With reference to FIG. 2, the computer device 4 acquires the inertial measurements dVX(t+k×Te), dVY(t+k×Te), and dVZ(t+k×Te), as taken and delivered by the accelerometers of the inertial unit 31 at various sampling instants t+k×Te throughout the operating period T1, where Te designates the sampling period, and k designates a positive integer (step E10). It is assumed here that the duration of the operating period T1 is N1 sampling periods, i.e. N1×Te.

The inertial measurements dVX, dVY, and dVZ characterize speed differences measured over a known duration. In the implementation described herein, these inertial measurements are rendered discrete by the inertial unit. It serves to evaluate linear accelerations expressed in units that result from being made discrete, over said known duration (i.e. by multiplying the inertial measurements by the digitizing step size, e.g. expressed in meters per second, and by dividing the result of the multiplication by the duration of the measurement, expressed in seconds). These linear accelerations represent a measurement of the local magnitude of gravity as shared along the three axes (X, Y, Z) of the inertial unit.

More precisely, the measurements dVX(t+k×Te), dVY(t+k×Te), and dVZ(t+k×Te), delivered by the inertial unit are characteristic of the speed variation perceived by the accelerometers of the inertial unit 31 between two successive sampling instants t+(k−1)×Te and t+k×Te (0<k≤N1). In the implementation described herein, these measurements are digitized, i.e. discrete: each measurement delivered by the inertial unit to the computer device 4 is thus in the form of an integer, such that the speed difference that is actually associated with the measurement is obtained by multiplying the measurement by the digitizing stepsize written δ (and ignoring a digitizing remainder).

Thus, the speed difference dVX1(t+k×Te) as actually measured along the axis X of the inertial unit 31 at the instant t+k×Te, is equal to:

$$dVX1(t+k\times Te) = dVX(t+k\times Te)\times \delta + \eta X$$

where ηX characterizes the digitizing remainder, which is less than the digitizing stepsize.

Likewise, the speed differences dVY1(t+k×Te), and dVZ1(t+k×Te), as actually measured along the axes Y and Z respectively of the inertial unit 31 at the instant t+kTe, are equal to:

$$dVY1(t+k\times Te) = dVY(t+k\times Te)\times \delta + \eta Y$$

$$dVZ1(t+k\times Te) = dVZ(t+k\times Te)\times \delta + \eta Z$$

where ηY and ηZ characterize the digitizing remainders, that are less than the digitizing stepsize.

In the implementation described herein, it should be observed that, prior to digitizing, the inertial unit 31 adds the digitizing remainders ηX, ηY, and ηZ to the speed differences measured for the following sampling instant.

The discrete measurements delivered by the accelerometers of the inertial unit thus present variation as a function of time associated with the digitizing, and also associated with the presence of measurement noise.

In order to smooth these effects and in order to be able to use the discrete inertial measurements dVX, dVY, and dVZ delivered by the inertial unit 31 more reliably, the computer 4 performs specific processing in the presently-described implementation.

More precisely, for each axis X, Y, and Z, and at each instant t+n×Te during the period T1 (i.e. 0<k≤N1), the discrete inertial measurements acquired at the preceding instants are summed (step E20). Thereafter, using the sums as obtained in this way, estimates are calculated for the accelerations measured by the inertial unit over the period T1 for the three axes, and written respectively AX1, AY1, and AZ1.

Thus, for each sampling instant t+n×Te of the period T1 (i.e. 0<n≤N1), the following sum values SumdVX, SumdVY, and SumdVZ are evaluated:

$$SumdVX(t+nTe) = \sum_{k=1}^{n} dVX(t+kTe)$$

$$SumdVY(t+nTe) = \sum_{k=1}^{n} dVY(t+kTe)$$

$$SumdVZ(t+nTe) = \sum_{k=1}^{n} dVZ(t+kTe)$$

Figure 4A:
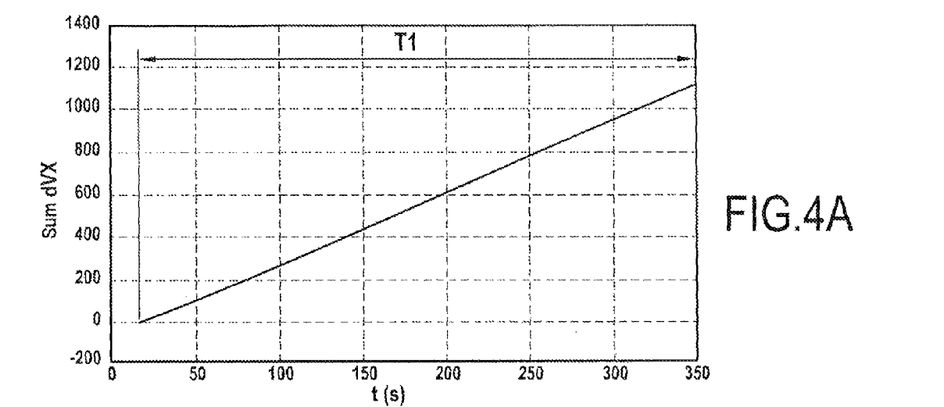
FIGS. 4A to 4C are graphs showing examples of inertial measurements (linear speed differences) summed over a first period of operation for evaluating the biases in elevation and in cant shown in FIGS. 3A and 3B.
Figure 4B:
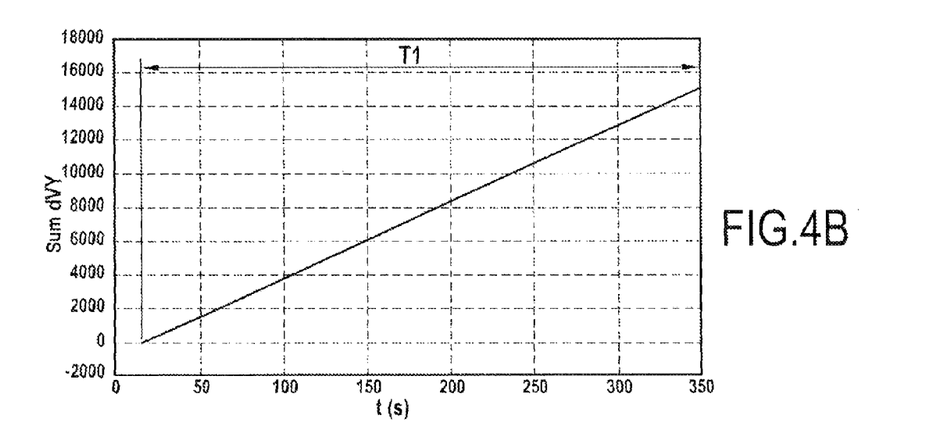
Figure 4C:
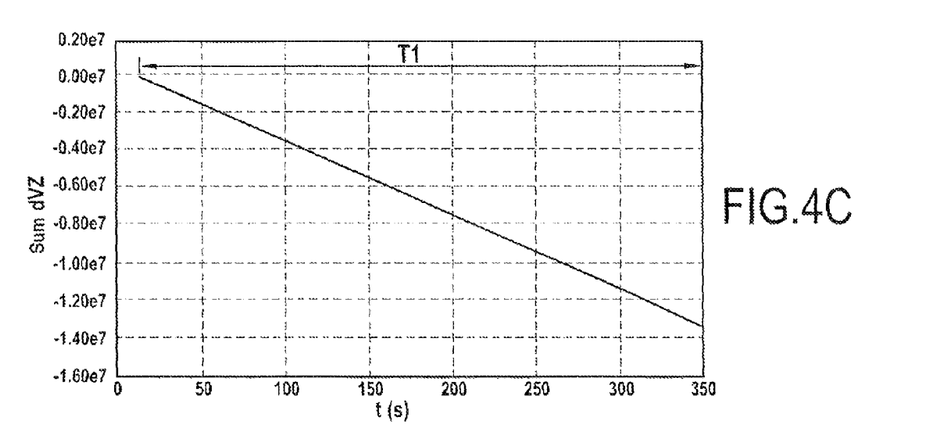

FIGS. 4A to 4C give examples of values SumdVX, SumdVY, and SumdVZ obtained as a function of time over the operating period T1. The digital values are given purely by way of indication.

In FIGS. 4A and 4B, it can be seen that the sums SumdVX and SumdVY of the discrete inertial measurements dVX and dVY are not zero along the axes X and Y of the inertial unit: this confirms the existence of angular biases in elevation α and in cant β between the axes of the inertial unit 31 and the terrestrial frame of reference. In contrast, obtaining a non-zero sum value SumdVZ along the Z axis is to be expected, given that the local magnitude of gravity acts along the axis Z.

Thereafter, on the basis of the sums as calculated in this way, acceleration estimates are evaluated as measured along each of the axes during the period T1 of duration N1×Te, using the following equations (step E20):

$$AX1 = SumdVX(t + N1 \times Te) \times \frac{\delta}{N1 \times Te} \quad (1)$$

$$AY1 = SumdVY(t + N1 \times Te) \times \frac{\delta}{N1 \times Te} \quad (2)$$

$$AZ1 = SumdVZ(t + N1 \times Te) \times \frac{\delta}{N1 \times Te} \quad (3)$$

The values AX1, AY1, and AZ1 constitute data representative of the local magnitude of gravity as perceived by the inertial unit 31 in the meaning of the invention.

The period T1 is selected to be sufficiently long (i.e. N1 is selected to be sufficiently large) to reduce the effects of digitizing and of measurement noise. Making such a selection presents no difficulty for the person skilled in the art.

In order to evaluate the biases α and β, the invention relies on the fact that, in known manner, when in the presence of angular biases α and β, the acceleration that the inertial unit 31 ought theoretically to measure is expressed along the axes X, Y, and Z as a function of the local magnitude G of gravity. More precisely, if these accelerations along the axes X, Y, and Z are written respectively AX2, AY2, and AZ2, then:

$$AX2 = -G \sin \alpha \quad (4)$$

$$AY2 = G \sin \beta \cos \alpha \quad (5)$$

$$AZ2 = G \cos \beta \cos \alpha \quad (6)$$

As a first approximation, the value of G may be taken as being given by:

$$G = 9.7803 + 0.0519 \sin^2(\text{Lat}) + 3.08 \times 10^{-6} \times \text{Alt}$$

where Lat and Alt designate respectively the (known) latitude and the altitude of the location under consideration (i.e. where the movement simulator 2 and the inertial unit 31 are located). It should be observed that in this expression, the altitude Alt is expressed in an aviation frame of reference in which the axis Z points downwards (such that the altitude of a point situated above sea level is negative).

In a variant, the value of G may be evaluated using more accurate algorithms for calculating the local magnitude of gravity that are known to the person skilled in the art and not described in detail herein, depending on the accuracy that is desired in the context of the application under consideration.

It follows from equations (4), (5), and (6) that:

$$\beta = \arctan\left(\frac{AY2}{AZ2}\right) \quad (7)$$

$$\alpha = \arcsin\left(-\frac{AX2}{G}\right) \quad (8)$$

An estimate of the values of the angular biases α and β is then obtained by the computer 4 by replacing the variables AX2, AY2, and AZ2 in equations (7) and (8) by the values AX1, AY1, and AZ1 obtained using equations (1), (2), and (3) (step E30).

The biases as estimated in this way are then compensated in this implementation by the computer 4 using the communications means 44 to send the (additive) inverses of the values of the angles α and β as evaluated in this way (step E40) to the control unit 22 of the movement simulator 2.

On receiving the inverses of the values of the angles α and β, the movement simulator 2 applies those inverse values to the inertial unit 31 so as to modify its reference position Pref and correct the angular biases that exist relative to the terrestrial frame of reference. The new reference position Pref' of the inertial unit 31 is then harmonized relative to the vertical at the location.

In a variant, the angles −α and −β may be incorporated in the unit 22 by an operator.

This step closes stage Φ1. At the end of this stage, the axes of the inertial unit 31, and thus the axes of the movement simulator 2, are harmonized with the vertical at the location.

In the implementation described herein, after stage Φ1 for correcting the angular biases in elevation and in cant that were affecting the frame of reference of the movement simulator 2, stage Φ2 is performed seeking to correct any angular bias in heading that might affect the frame of reference of the movement simulator.

Stage Φ2 differs from stage Φ1 in that in order to estimate the value of the bias in heading γ that affects the frame of reference of the inertial unit 31 and of the movement simulator 2 relative to geographical north, it makes use of the inertial measurements dθX, dθY, and dθZ as taken and delivered by the gyros of the inertial unit during an operating period T2.

The inertial measurements dθX, dθY, and dθZ are characterized by angle differences measured over a known duration. In the implementation described herein, these inertial measurements are rendered discrete by the inertial unit. They enable angular speeds to be evaluated that are expressed in units resulting from being made discrete over said known duration. These angular speeds represent the speed of rotation of the earth as shared over the three axes (X, Y, Z) of the inertial unit.

Figure 5A:
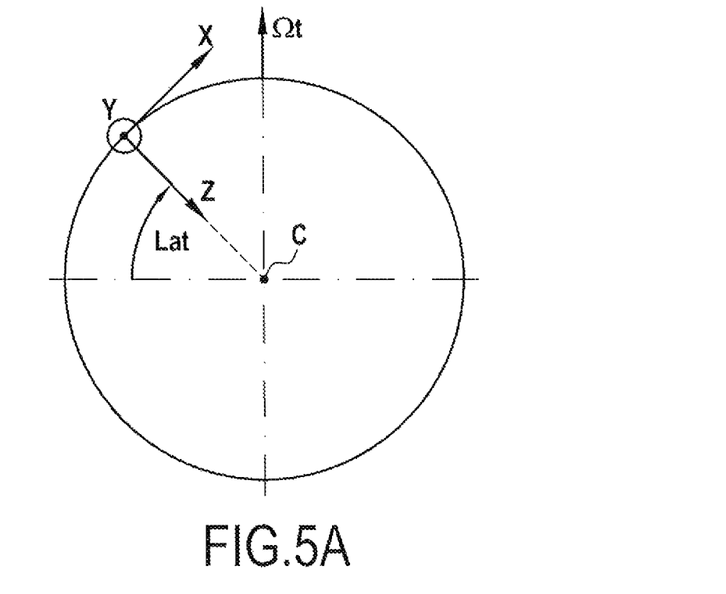
FIGS. 5A and 5B show an example of bias in heading affecting the frame of reference of the angular positioner.
Figure 5B:
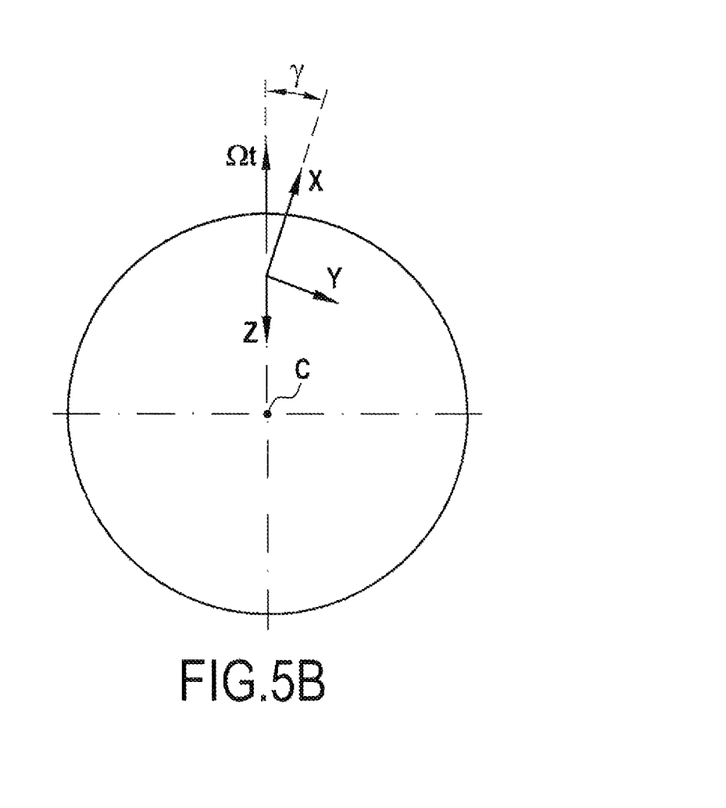

FIGS. 5A and 5B show the terrestrial rotation vector Ωt and the frame of reference (X, Y, Z) of the inertial unit, after correcting the biases α and β in elevation and in cant. In these figures:

Lat designates the latitude of the location of the movement simulator 2 carrying the inertial unit 31; and γ designates the heading angle affecting the frame of reference (X, Y, Z) of the inertial unit relative to geographical north.

In order to evaluate the angle γ, the invention advantageously makes use of the fact that when the frames of reference are harmonized, the inertial unit 31 ought theoretically to measure a terrestrial rotation value GY2 that is zero relative to its axis Y. Furthermore, the inertial measurements that the gyros of the inertial unit 31 ought theoretically to deliver in the absence of an angular bias in heading are expressed for the axes X and Z as follows:

$$GX2 = \|\Omega t\| \times \cos(\mathrm{Lat}) \qquad (9)$$

$$GZ2 = -\|\Omega t\| \times \sin(\mathrm{Lat}) \qquad (10)$$

where $\|\Omega t\|$ designates the norm of the vector Ωt.

In the presence of an angular bias in heading relative to geographical north, the speed of rotation theoretically measured by the gyros of the inertial unit 31 about the axis Y is expressed as follows:

$$GY2 = -\|\Omega t\| \times \cos(\mathrm{Lat}) \times \sin(\gamma) \qquad (11)$$

It follows from equation (11) that:

$$\gamma = \arcsin\left[-\frac{GY2}{\|\Omega t\| \times \cos(Lat)}\right] \qquad (12)$$

Thus, with reference to FIG. 2, and in a manner similar to stage Φ1, in order to evaluate the heading angle γ, the procedure is as follows.

Firstly, the computer device 4 acquires inertial measurements dθX(t+k×Te), dθY(t+k×Te), and dθZ(t+k×Te) as delivered by the gyros of the inertial unit 31 at various sampling instants t+K×Te during the operating period T2 (step E50). It is assumed here that the duration of the operating period T2 is N2 sampling periods, i.e. N2×Te.

As for the period T1, during the period T2, it is ensured that the movement simulator 2 does not receive any digital command from the computer device 4: the movement simulator 2 is thus held stationary and the inertial unit 31 is in its reference position Pref'' (i.e. a reference position that is corrected for the angular biases α and β). In other words, during the period T2, the movement simulator 2 does not apply any movement to the inertial unit 31 and keeps in its reference position Pref'.

The inertial measurements dθX(t+k×Te), dθY(t+k×Te), and dθZ(t+k×Te) are representative of the angular movements perceived by the gyros of the inertial unit 31 between two successive sampling instants, as measured respectively about the three axes (X, Y, Z) of the inertial unit. In the presently-described implementation, and as for the measurements dVX, dVY, and dVZ, the measurements are digitized, i.e. in discrete form: each measurement delivered by the inertial unit 31 to the computer device 4 is thus in the form of an integer, such that the speed of rotation that is actually associated with the measurement may be obtained by multiplying the measurement by the digitizing stepsize δ' (e.g. expressed in radians) and by dividing the result of the multiplication by the duration (Te) during which the measurement is taken (expressed in seconds), and ignoring a digitizing remainder.

The angle differences dθX1(t+k×Te) as actually measured about the axis X of the inertial unit 31 at the instant t+k×Te is equal to:

$$d\theta X1(t+k\times Te) = d\theta X(t+k\times Te) \times \delta' + \eta X'$$

where ηX' is the digitizing remainder, that is less than the digitizing stepsize.

Likewise, the angle differences dθY1(t+k×Te) and dθZ1(t+k×Te) as actually measured about the axes Y and Z respectively of the inertial unit 31 at the instant t+kTe are equal to:

$$d\theta Y1(t+k\times Te) = d\theta Y(t+k\times Te) \times \delta' + \eta Y'$$

$$d\theta Z1(t+k\times Te) = d\theta Z(t+k\times Te) \times \delta' + \eta Z'$$

where ηY' and ηZ' characterize the digitizing remainders that are less than the digitizing stepsize.

In the presently-described implementation, and as for the speed differences dVX, dVY, and dVZ, it should be observed that, prior to digitizing, the inertial unit 31 adds the digitizing remainders ηX', ηY', and ηZ' to the angle differences as measured for the following sampling instants.

The discrete measurements delivered by the gyros of the inertial unit 31 thus present variation as a function of time associated with digitizing, and as a function of the presence of measurement noise.

In order to smooth these effects and in order to be able to use the discrete inertial measurements dθX, dθY, and dθZ as delivered by the inertial unit 31 in reliable manner, the computer 4 performs processing similar to that described for the measurements dVX, dVY, and dVZ.

More precisely, for each of the axes X, Y, and Z, and at each instant t+k×Te during the period T2 (0<k≤N2), the sums of the discrete inertial measurements acquired at the preceding instants are evaluated (step E60).

Thereafter, on the basis of the sums as obtained in this way, an estimate is calculated for the speeds of rotation as perceived by the inertial unit over the period T2 about the three axes, written respectively GX1, GY1, and GZ1.

Thus, for each sampling instant t+n×Te of the period T2 (0<n≤N2), the following sum values SumdθX, SumdθY, and SumdθZ are evaluated:

$$Sumd\theta X(t + n \times Te) = \sum_{k=1}^{n} d\theta X(t + k \times Te)$$

$$Sumd\theta Y(t + n \times Te) = \sum_{k=1}^{n} d\theta Y(t + k \times Te)$$

$$Sumd\theta Z(t + n \times Te) = \sum_{k=1}^{n} d\theta Z(t + k \times Te)$$

Figure 6A:
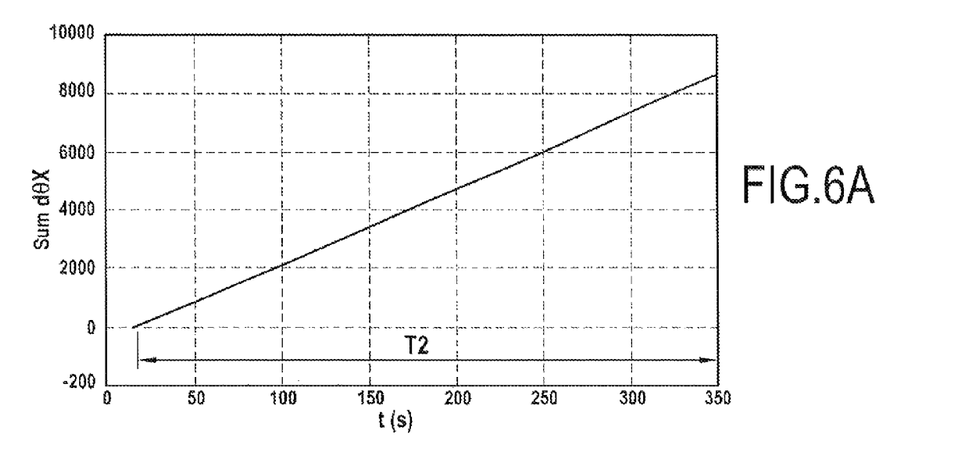
FIGS. 6A to 6C are graphs showing examples of inertial measurements (angle differences) summed over a second period of operation for evaluating the bias in heading shown in FIGS. 5A and 5B.
Figure 6B:
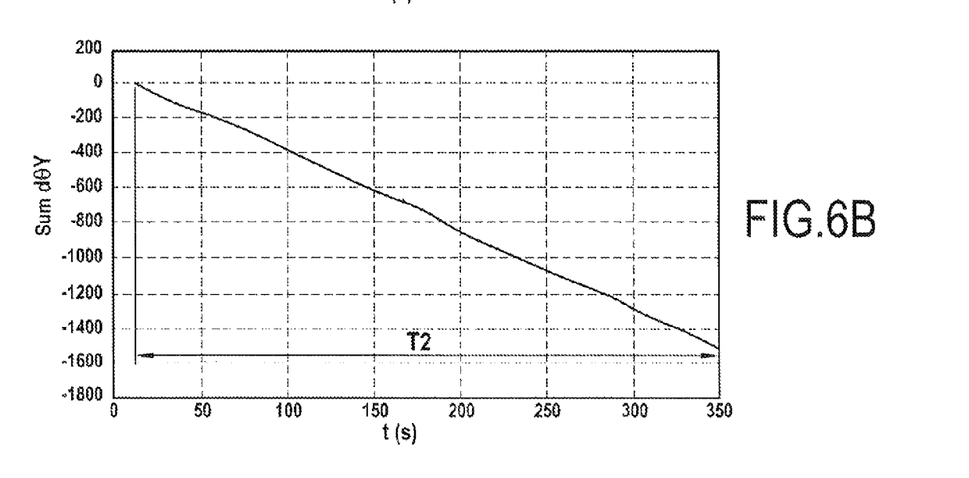
Figure 6C:
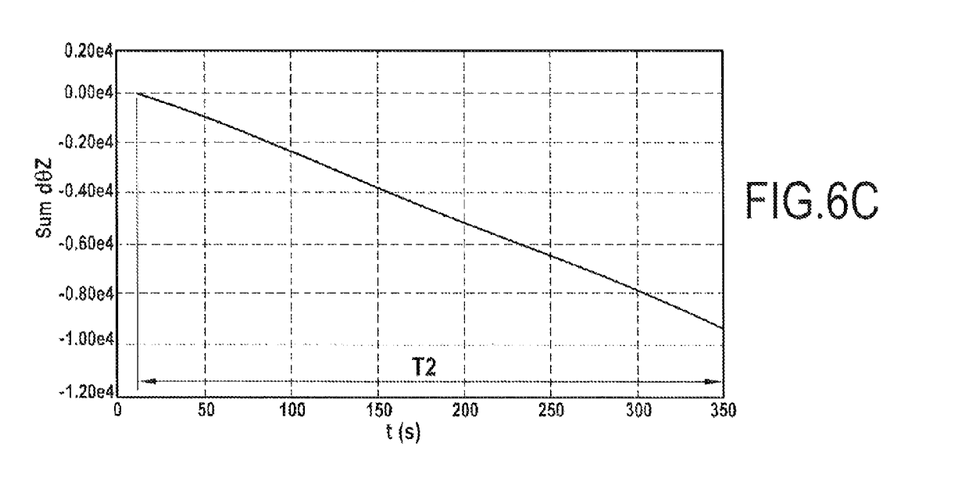

FIGS. 6A to 6C show an example of values for SumdθX, SumdθY, and SumdθZ as obtained as a function of time over the operating period T2. The numerical values are given purely by way of indication.

In FIG. 6B, it can be seen that the sum SumdθY of the discrete inertial measurement dθY is not zero about the axis Y of the inertial unit: this confirms the existence of an angular bias in heading γ between the axes of the inertial unit 31 and the axes of the terrestrial frame of reference.

Thereafter, on the basis of the sums as calculated in this way, an estimate is evaluated for the speed of rotation as measured about each axis during the period T2 of duration N2×Te, using the following equations (step E60):

$$GX1 = Sumd\theta X(t + N2 \times Te) \times \frac{\delta'}{N2 \times Te} \quad (13)$$

$$GY1 = Sumd\theta Y(t + N2 \times Te) \times \frac{\delta'}{N2 \times Te} \quad (14)$$

$$GZ1 = Sumd\theta Z(t + N2 \times Te) \times \frac{\delta'}{N2 \times Te} \quad (15)$$

The values GX1, GY1, and GZ1 are representative of a speed of terrestrial rotation as perceived by the inertial unit 31 in the meaning of the invention.

The period T2 is selected to be sufficiently long (i.e. N2 is selected to be sufficiently large) to reduce the effects of digitizing and the effects of measurement noise. Making such a selection presents no difficulty for the person skilled in the art.

An estimate of the value for the angular bias γ is then obtained by the computer 4 by replacing in equation (12) the variable GY2 with the value GY1 obtained using equation (14) (step E70). The value of ‖Ωt‖ is known to the person skilled in the art from elsewhere.

It should be observed that evaluating the value of the angular bias γ does not, properly speaking, require the values GX1 and GZ1 to be evaluated, since the value of the terrestrial speed of rotation ‖Ωt‖ is itself known. Thus, in a variant implementation, step E60 could include evaluating only the value GY1.

The angular bias γ as estimated in this way is compensated in this implementation by the computer 4 using the communication means 44 to send the (additive) inverse of the value of the angular bias γ as evaluated in this way to the control unit 22 of the movement simulator 2 (step E80).

On receiving the inverse of the angular value γ, the movement simulator 2 applies this inverse value to the inertial unit 31 so as to modify its reference position Pref' and correct the angular bias in heading that exists relative to the terrestrial frame of reference. The new reference position Pref'' of the inertial unit 31 is then harmonized relative to geographical north.

In a variant, the angle −γ may be incorporated in the control unit 22 by an operator.

This step closes the stage Φ2. At the end of this stage, the axes of the inertial unit 31, and thus the axes of the movement simulator 2, are harmonized with the vertical at the location and with geographical north, i.e. with the terrestrial frame of reference.

It should be observed that the frame of reference of the movement simulator is harmonized in this implementation by providing the movement simulator with the inverses of the values of the angular biases α, β, and γ as evaluated using the invention, so that the movement simulator can take them into account in its digital commands when it causes the inertial unit 31 to be moved, or more generally when it causes the moving body that it carries to be moved. Nevertheless, it is possible to envisage using other ways of compensating for the angular biases in evaluation, in cant, and in heading.

The invention claimed is:

1. A harmonization method for harmonizing a frame of reference of an angular positioner suitable for receiving a moving body or a flying vehicle relative to the terrestrial frame of reference, the angular positioner having a mounted measurement device for taking inertial measurements of the moving body or flying vehicle, the method comprising:

obtaining, using inertial measurements taken by the mounted measurement device during at least one predetermined operating period, values representative of a local magnitude of gravity as perceived by the mounted measurement device and/or of a speed of rotation of the earth, the angular positioner being held stationary during the at least one operating period with the values representing the local magnitude of gravity as perceived by the mounted measurement device and/or of the speed of rotation of the earth being obtained by summing the inertial measurements taken over the at least one operating period;

evaluating, using the obtained values, at least one angular bias affecting the frame of reference of the positioner; and harmonizing the frame of reference of the positioner relative to the terrestrial frame of reference by compensating for the evaluated at least one angular bias.

2. A harmonization method according to claim 1, wherein during the obtaining, values are obtained for a local magnitude of gravity as perceived by the measurement device, and during the evaluating and from these values, an angular bias is evaluated in elevation and/or in cant.

3. A harmonization method according to claim 1, wherein during the obtaining, values are obtained that are representative of the speed of rotation of the earth, and during the evaluating and from these values, an angular bias is evaluated in heading.

4. A harmonization method according to claim 3, wherein when at least one angular bias in elevation and/or in cant and at least one angular bias in heading are compensated, the angular bias in elevation and/or in cant is compensated prior to the operating period during which the inertial measurements used for evaluating the bias in heading are taken by the measurement device.

5. A harmonization method according to claim 1, wherein said angular positioner is a movement simulator or a test bench or a micrometric table.

6. A harmonization method according to claim 1, wherein the inertial measurements are taken by incorporating at least one accelerometer and/or at least one gyro fitted to the measurement device.

7. A computer program including instructions for executing steps of the harmonization method according to claim 1 when said program is executed by a computer.

8. A computer-readable recording medium having a recording of a computer program including instructions for executing steps of the harmonization method according to claim 1.

9. A harmonization system for harmonizing a frame of reference of an angular positioner suitable for receiving a moving body or a flying vehicle relative to a terrestrial frame of reference, the angular positioner having a mounted measurement device for taking inertial measurements of the moving body or flying vehicle, the system comprising:

obtaining means for using the inertial measurements taken by the mounted measurement device during at least one predetermined operating period to obtain values representative of a local magnitude of gravity as perceived by the mounted measurement device and/or of a speed of rotation of the earth, the angular positioner being held stationary during the at least one operating period, the obtaining means configured to obtain the values representing the local magnitude of gravity and/or of the speed of rotation of the earth by summing the inertial measurements taken over the at least one operating period;

evaluation means for evaluating at least one angular bias affecting the frame of reference of the positioner based on the obtained values; and harmonization means for harmonizing the frame of reference of the positioner relative to the terrestrial frame of reference, the harmonization means including means for compensating the evaluated at least one angular bias.

10. A harmonization system according to claim 9, wherein the obtaining means are suitable for obtaining values representative of a local magnitude of gravity as perceived by the measurement device, and in that the evaluation means are suitable for evaluating an angular bias in elevation and/or in cant from these values.

11. A harmonization system according to claim 9, wherein the obtaining means are suitable for obtaining values representative of a speed of rotation of the earth, and in that the evaluation means are suitable for evaluating an angular bias in heading from these values.

12. A harmonization system according to claim 9, wherein said angular positioner is a movement simulator, or a test bench, or a micrometric table.

13. A harmonization system according to claim 9, wherein the inertial measurements are taken by incorporating at least one accelerometer and/or of at least one gyro fitted to the measurement device.

* * * * *